Patented Apr. 13, 1954

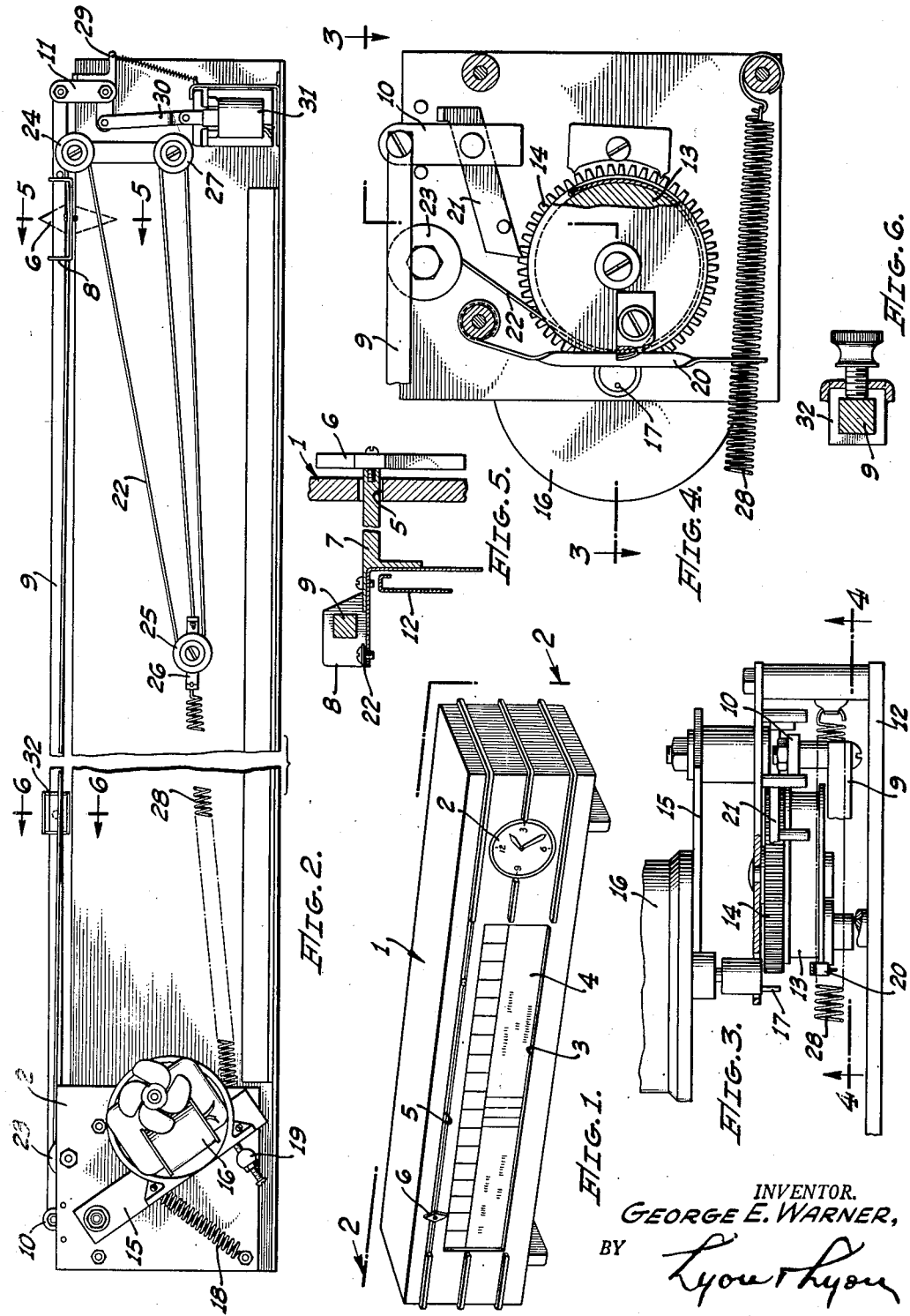

2,675,541

UNITED STATES PATENT OFFICE 2,675,541

TIME INDICATING DEVICE FOR MOTION PICTURES

George E. Warner, Alhambra, Calif., assignor of thirty-seven per cent to Joseph H. Reid, thirty-three per cent to John C. Woodson, and thirty per cent to John L. Brackin, all of Los Angeles, Calif.

Application December 2, 1950, Serial No. 198,788

6 Claims. (Cl. 340—213)

My invention relates to time indicating means for motion pictures, and included in the objects of my invention are:

First, to provide a means of this class which may be placed in a foyer or entrance of a theatre or in lobbies of hotels or other public places to indicate the time, to advertise a current motion picture and to indicate precisely the subject being shown at the theatre at any given moment as well as the length of time the subject has been showing and the length of time before the next "break," thus enabling one to determine how long a motion picture show or part thereof will last, and when one should arrive at the show.

Second, to provide a device of this class wherein the various subjects comprising a motion picture show are represented in the panel in proportion to the time required for showing and a pointer is moved along the panel to indicate which subject is being shown.

Third, to provide in a device of this class a novel means for driving the pointer and a mechanism for automatically returning the pointer to its starting position after completion of its movement across the panel.

Fourth, to provide in a device of this class means whereby the pointer may be reset by remote control.

With the above and other objects in view as may appear hereinafter, reference is directed to the accompanying drawings in which:

Figure 1 is a perspective view of my time device indicating means for motion pictures.

Figure 2 is an elevational view thereof, taken from the plane 2—2 of Figure 1, showing the operating mechanism removed from the case.

Figure 3 is a partial sectional, partial plan view of the drive mechanism taken through 3—3 of Figure 4.

Figure 4 is a sectional view taken through 4—4 of Figure 3.

Figure 5 is a fragmentary sectional view through 5—5 of Figure 2.

Figure 6 is a fragmentary sectional view through 6—6 of Figure 2.

My time indicating means for motion pictures is contained in an elongated, rectangular case 1. The case is so arranged that an electric clock 2 may be mounted at one end of its front side. The front side is also provided with an elongated panel opening 3 behind which is mounted a removable panel 4, preferably translucent so that it may be illuminated from the back side by means of lamps not shown. Printed on the panel 4 is advertising matter, representing the subject matter of the motion pictures or at least titles of the motion pictures; the lineal space occupied by each motion picture advertisement is in proportion to the time required to show the motion picture, thus advertisements of feature pictures occupy the major portion of the panel, whereas newsreel or short subjects occupy a portion of the smaller space.

A slot 5 is provided above the panel opening 3; a pointer 6 is disposed in front of the slot and is attached to an arm 7 extending through the slot into the case 1, the arm is attached to a slide member 8 which rides on a bar 9, the bar 9 constitutes a trip bar as will be described hereinafter, and is capable of limited longitudinal movement by means of parallel link members 10 and 11, connected to its extremities and to the extremities of an upright frame 12.

The frame 12 also supports a drum 13 adjacent one end; the drum is provided with a gear 14. Supported from the frame 12 by means of an arm 15 is a drive motor 16 having an eccentric drive pin 17, arranged for intermittent engagement with the teeth of the gear 14. A spring 18 and stop 19 maintain the drive pin in proper relation to the gear 14 and provide for adjustment. An escape lever 20 is carried by the frame 12 for engagement with the gear 14. The gear is also engaged by a pawl 21 which is operatively connected with the link member 10 so that upon limited axial movement of the bar 9, the pawl may be lifted from the engagement with the gear 14.

A cable 22 is wrapped on the drum 13 and passes over a pulley 23 positioned behind the bar 9. The cable extends to and is attached to the slide member 8. The cable extends beyond the slide member 8 and over a second pulley 24, then around a travelling pulley 25, guided by a yoke 26, then around a fixed pulley 27 and back to the yoke 26. A spring 28 is attached to the yoke 26, and is anchored to the frame 12. By this arrangement, the cable is maintained under tension and the spring 28 operates in opposition to the drum 13.

The link member 11 at the end of the bar 9, remote from the drum, is operated by a bell crank 29, connected to a link 30 which, in turn, is operated by a solenoid 31.

A slide stop 32 is mounted on the bar 9 and provided with a set screw accessible from the front of the case 1.

Operation of my time indicating means for motion pictures is as follows:

The speed of the drive motor is so selected that the length of time required to draw the pointer 6 along the length of the panel 4 is equal to the time required to complete a motion picture show, involving one or more features, a newsreel and short subjects. As the pointer is drawn across the panel, a cable winds on the drum 13 and the drum is prevented against back movement by the pawl 21. When the slide member 8, which carries the pointer 6, engages the stop 32, the bar 9 is shifted longitudinally to lift the pawl 21. As soon as the eccentric drive pin 17 itself engages the gear 14, the drum is released and the pointer returns to its starting position, the return movement being dampened by the escape lever 20. The stop 32 is, of course, set to coincide with the end of the motion picture show which may or may not require the entire space of the panel.

The solenoid 31 may be connected to a central switch and is operated at the beginning of the "first show" of each day, so that the pointer may be returned to its starting position, irrespective of where it may have previously stopped.

Having fully described my invention, it is to be understood that I do not wish to be limited to the details herein set forth, but my invention is of the full scope of the appended claims.

I claim:

1. A time indicating device for motion pictures, involving: a case having therein a panel representing the subjects of a motion picture show each spaced of a width proportional to the time required to show the subject; a pointer moveable along said panel to indicate the subject being shown at any given moment; a time controlled drive means for said pointer including a drum and a cable attached to said pointer and wrapped on said drum; yieldable means urging said pointer to a starting position at one end of said panel, and means for releasing said pointer from said drum to permit quick return of said pointer under urge of said yieldable means.

2. A time indicating device for motion pictures, involving: a case having therein a panel representing the subjects of a motion picture show each spaced of a width proportional to the time required to show the subject; a pointer moveable along said panel to indicate the subject being shown at any given moment; a drum; a drive for said drum; a cable wrapped on said drum and connected to said pointer; yieldable means connected with said cable and urging said pointer to a starting position at one extremity of said panel in opposition to said drum and drive; a pawl normally restraining said yieldable means, and a trip bar operable to release said drum to permit return of said pointer to said starting position.

3. A time indicating device for motion pictures, involving: a case having therein a panel representing the subjects of a motion picture show each spaced of a width proportional to the time required to show the subject; a pointer moveable along said panel to indicate the subject being shown at any given moment; a drum; travelling and anchor pulleys; a cable wrapped on said drum, attached to said pointer and sheaved on said pulleys; yieldable means connected with said travelling pulley and operable in opposition to said drum to urge said pointer to a starting position at one extremity of said panel; a drive means for said drum; a pawl restraining said drum against movement under urge of said yieldable means; and trip means engageable by said pointer to release said pawl to permit return of said pointer to its starting position.

4. A device as set forth in claim 3 wherein said drive means intermittently engages said drum and said trip means is operable between drive connections between said drum and said drive means.

5. A time indicating device for motion pictures, involving: a case having therein a panel representing the subjects of a motion picture show each spaced of a width proportional to the time required to show the subject; a pointer moveable along said panel to indicate the subject being shown at any given moment; a drum; travelling and anchor pulleys; a cable wrapped on said drum, attached to said pointer and sheaved on said pulleys; yieldable means connected with said travelling pulley and operable in opposition to said drum to urge said pointer to a starting position at one extremity of said panel; a drive means for said drum; a pawl restraining said drum against movement under urge of said yieldable means; trip means engageable by said pointer to release said pawl to permit return of said pointer to its starting position; and a remotely controlled means for operating said trip bar independently of said trip means.

6. A time indicating device for motion pictures, involving: a case having therein a panel representing the subjects of a motion picture show each spaced of a width proportional to the time required to show the subject; a pointer movable along said panel to indicate the subject being shown at any given moment; a track bar within said case extending the length of said panel; a slide member supporting said pointer and slidable on said track bar; a drum at one end of said case; traveling and anchor pulleys; a cable wrapped on said drum attached to said pointer slide member and sheaved on said pulleys whereby on winding of said cable on said drum, said slide member is drawn along said track bar thereby to move said pointer; a spring connected with said traveling pulley and operable in opposition to said drum to return said slide member and pointer to their starting position; means for driving said drum; a pawl for restraining said drum against return movement in response to said spring; means operatively connecting said pawl with said track bar, said track bar being capable of limited longitudinal movement; and an adjustable stop on said track bar engageable by said slide member to shift said track bar thereby to operate said pawl, release said drum and return said pointer to its initial position.

References Cited in the file of this patent

UNITED STATES PATENTS

| Number | Name | Date |
|---|---|---|
| 1,620,987 | Trenor | Mar. 15, 1927 |
| 1,645,563 | Whistlecroft | Oct. 18, 1927 |
| 2,419,394 | Erhard | Apr. 22, 1947 |